(12) United States Patent
Feng et al.

(10) Patent No.: US 11,103,996 B2
(45) Date of Patent: Aug. 31, 2021

(54) ROBOT JOINT SPACE POINT-TO-POINT MOVEMENT TRAJECTORY PLANNING METHOD

(71) Applicant: NANJING ESTUN ROBOTICS CO., LTD, Nanjing (CN)

(72) Inventors: Riyue Feng, Nanjing (CN); Jihu Wang, Nanjing (CN); Zhengxian Xia, Nanjing (CN); Tingting Pan, Nanjing (CN); Bo Wu, Nanjing (CN); Shuyi Jing, Nanjing (CN)

(73) Assignee: NANJING ESTUN ROBOTICS CO., LTD, Jiangsu (CN)

( * ) Notice: Subject to any disclaimer, the term of this patent is extended or adjusted under 35 U.S.C. 154(b) by 272 days.

(21) Appl. No.: 16/322,091

(22) PCT Filed: Dec. 14, 2017

(86) PCT No.: PCT/CN2017/116112
§ 371 (c)(1),
(2) Date: Jan. 30, 2019

(87) PCT Pub. No.: WO2018/137432
PCT Pub. Date: Aug. 2, 2018

(65) Prior Publication Data
US 2019/0160674 A1    May 30, 2019

(30) Foreign Application Priority Data
Aug. 10, 2017 (CN) .......................... 201710678376.1

(51) Int. Cl.
*B25J 9/16* (2006.01)
*G05B 19/19* (2006.01)

(52) U.S. Cl.
CPC ........... *B25J 9/1664* (2013.01); *B25J 9/1653* (2013.01); *G05B 19/19* (2013.01); *G05B 2219/39206* (2013.01); *G05B 2219/40519* (2013.01)

(58) Field of Classification Search
CPC ....... B25J 9/1664; B25J 9/1653; G05B 19/19; G05B 19/23; G05B 19/41;
(Continued)

(56) References Cited

U.S. PATENT DOCUMENTS

2006/0190136 A1*  8/2006  Boyer .................... B25J 9/1664
                                                        700/245

FOREIGN PATENT DOCUMENTS

CN      103853043 A     6/2014
CN      104090492     * 10/2014
(Continued)

*Primary Examiner* — Abby Y Lin
*Assistant Examiner* — Dylan M Katz
(74) *Attorney, Agent, or Firm* — Proi Intellectual Property US (57) ABSTRACT

A robot joint space point-to-point movement trajectory planning method. Joint space trajectory planning is performed according to the displacement of a robot from a start point to a target point during PTP movement and a limitation condition of a preset movement parameter physical quantity of each axis in a robot control system. An n-dimensional space is constructed by taking each axis of the robot as a vector, wherein n≥2, and the movement parameter physical quantity of each axis of the robot is verified according to a vector relationship between the n axes of the robot, so that a trajectory planning curve of each axis of the robot satisfies the limitation condition of the preset movement parameter physical quantity. The method has a small amount of calculations and strong real-time performance, the movement (Continued)

curves are mild, the control time is optimal, and the algorithm execution effect is good.

8 Claims, 4 Drawing Sheets

(58) Field of Classification Search
CPC ........... G05B 2219/39206; G05B 2219/40519;
G05B 2219/43168; G05B 2219/49202
See application file for complete search history.

(56) References Cited

FOREIGN PATENT DOCUMENTS

| | | |
|---|---|---|
| CN | 104090492 A | 10/2014 |
| CN | 105700530 A | 6/2016 |

* cited by examiner

ROBOT JOINT SPACE POINT-TO-POINT MOVEMENT TRAJECTORY PLANNING METHOD

FIELD OF THE INVENTION

The invention relates to a trajectory planning method for a robot, and particularly to a trajectory planning method for point-to-point motion in robot joint space.

BACKGROUND OF THE INVENTION

With the development of modern technology, industrial robots have more and more applications, and the forms of working tasks in various application fields get more diversified as well. There are high requirements on real-time control in a robot application scenario such that a robot control system needs to provide an efficient motion control strategy. As a key technology in a robot control system, the trajectory planning of robot motion directly determines the operating efficiency of the control system and plays an important role in whether a robot can complete high-speed and high-precision machining.

There are two kinds of motion trajectories commonly used by robots: linear and arc motion trajectories in Cartesian space; and point-to-point motion trajectories in joint space (i.e. a space consisting of all joint vectors determined by all joints of a robot). For linear and arc motion trajectories, a robot control system performs trajectory planning in Cartesian space, obtains the pose of a robot in the Cartesian space through interpolation, converts the pose into a corresponding joint position through inverse kinematics, and transfers the joint position into a motor to control the operation of the robot. For point-to-point motion trajectories, a robot control system performs trajectory planning in joint space, and a trajectory is passed through an interpolation module to obtain joint position which is directly outputted to a motor without conversion through inverse kinematics to control the operation of a robot.

The point-to-point motion of a robot in joint space is also known as PTP motion, which is directly planned for joints without inverse kinematics, and therefore widely applied to occasions where a robot performs rapid positioning and has no requirements on path of motion. For example, a robot needs to reach a specified target position quickly during teaching, and the common operation is PIT motion. Therefore, a trajectory planning method for joint space in a robot control system directly determines the operating efficiency of a robot.

In order to ensure smooth trajectories and smooth motion, the motion time of all axes of a robot needs to be strictly consistent when the robot performs PTP motion, i.e. all axes of the robot start simultaneously and stop simultaneously during the PIT motion. Since different physical quantities of motion parameters are set for each axis, the minimum time required for each axis to move to a target position is also different. Therefore, a reasonable trajectory planning method is required during the PTP motion of a robot, such that all axes can reach a target point from a starting point at the same time. In industrial robot control, the trajectory planning of PTP motion needs to be completed with little calculation in order to satisfy the requirements on real-time control in a robot control system.

In order to achieve the PTP motion of a robot, a method of the prior art is as follows: firstly, the motion of each axis is subjected to trajectory planning based on its corresponding physical quantities of motion parameters to obtain the motion time of each axis, the time is compared to select the maximum time there from, and then trajectory planning which satisfies the maximum time is respectively performed on each axis based on the maximum time. By taking S-curve trajectory planning as an example, the method of the prior art is as follows: firstly, each axis can be planned based on its respective desired velocity, acceleration, jerk and displacement to obtain the motion time of each axis, the maximum time is selected from the time, and then S-curve trajectory planning which satisfies the maximum time is respectively performed on each axis at the maximum time. In the above method, planning a synchronous PTP motion requires each axis of the robot to be planned once at a specified maximum velocity and to be planned once at a specified motion time. For a robot with n axes, a PTP motion using the above method requires at least 2n trajectory planning calculations. For example, a general six-joint robot has 6 axes, a PTP motion using the above method requires at least 12 trajectory planning calculations; and an SCARA robot has 4 axes, a PIT motion using the above method requires at least 8 trajectory planning calculations. Robots generally have multiple axes, and a PTP motion using the above method requires multiple trajectory planning with a huge calculation amount such that trajectory points may not be generated in a control cycle during the real-time planning in robot control, thus failing to meet the requirements on real-time control.

Chinese Patent Document entitled "Method and Device for Realizing Synchronous PTP Motion in Robot" (application number: 201210507592.7) discloses a method and a device for realizing synchronous point-to-point (PTP) motion in a robot. In the patent, for a robot with n axes, firstly, an axis with the maximum motion time in the n-axis robot is selected as a reference axis based on preset maximum value conditions on physical quantities of dynamic characteristics of each axis of the robot; secondly, velocity planning is performed on the reference axis based on an actual maximum acceleration of the reference axis; and finally, the velocity planning of the remaining axes in the robot is determined based on the displacement ratio. Synchronous PTP planning can be completed in a smaller calculation amount by the method of the patent. However, in this method, a calculation formula of equivalent uniform motion is employed during the calculation of the motion time at the time of selecting a reference axis and during the calculation of an actual acceleration and an actual jerk after the determination of the reference axis, but the actual motion has the acceleration and deceleration process. Therefore, the motion time selected by the method of the patent is not necessarily an optimal time for the PTP motion, and it may take a longer time to complete a PTP motion, thus affecting the efficiency of the robot in actual machining.

SUMMARY OF THE INVENTION

Technical problems to be solved by the invention are as follows: for the problems of a large calculation amount and a longer planned trajectory running time in the trajectory planning of PTP motion of a robot in the prior art, the invention provides a trajectory planning method for point-to-point motion in robot joint space, wherein trajectory planning is performed on the joint space based on preset constraints on physical quantities of motion parameters of each axis in a robot control system as well as the displacement of a robot from a starting point to a target point during the PTP motion. The method of the invention has smaller calculation amount and meets the requirements on real-time performance in robot control. Moreover, the trajectory planning of the PTP motion of the robot by the method of the invention enables the robot to smoothly move at an optimal time, thus effectively ensuring the operating efficiency of the robot during working and greatly improving the motion tempo of the robot in an actual working task.

The trajectory planning method for point-to-point motion in robot joint space according to the invention comprises the steps of:

step 1: determining the number of axes based on the type of a robot, constructing an n-dimensional space (n≥2) with each axis of the robot as a vector for a robot with n axes, and defining a generalized virtual axis in the n-dimensional space, wherein the generalized virtual axis is a vector in the n-dimensional space, which is determined by a starting point and a target point of the PTP motion of the robot, and its property describes the vector relation among the n axes of the robot;

step 2: determining the displacement of each axis of the robot based on the starting point and the target point of the PTP motion of the robot, which is respectively recorded as S1, S2, ..., Sn; and calculating the motion displacement Sunite corresponding to the generalized virtual axis, wherein the relation between the generalized virtual axis and the displacement of each axis of the robot is as follows:

$$Sunite=(S1^2+S2^2+ \ldots +Sn^2)^{1/2}$$

step 3: calculating physical quantities of motion parameters corresponding to the generalized virtual axis based on preset constraints on physical quantities of motion parameters of each axis of the robot, wherein these parameters describe the moving capability of the robot, including parameters such as the maximum velocity, the maximum acceleration and the maximum jerk allowed by a system during the motion of the robot;

a preset maximum velocity of each axis of the robot is recorded as Vel_max(i), where i denotes the axis number of the robot and its value is 1, 2, ..., n; the maximum velocity Vel_unite corresponding to the generalized virtual axis is calculated as follows:

$$\text{Vel\_unite}=(\text{Vel\_max}(1)^2+\text{Vel\_max}(2)^2+ \ldots + \text{Vel\_max}(n)^2)^{1/2};$$

other parameters of the generalized virtual axis are calculated in the same manner as the above velocity of the generalized virtual axis;

a preset maximum acceleration of each axis of the robot is recorded as Acc_max(i) and the maximum acceleration Acc_unite corresponding to the generalized virtual axis is calculated as follows:

$$\text{Acc\_unite}=(\text{Acc\_max}(1)^2+\text{Acc\_max}(2)^2+ \ldots + \text{Acc\_max}(n)^2)^{1/2}; \text{ and}$$

a preset maximum jerk of each axis of the robot is recorded as Jerk_max(i) and the maximum jerk Jerk_unite corresponding to the generalized virtual axis is calculated as follows:

$$\text{Jerk\_unite}=(\text{Jerk\_max}(1)^2+\text{Jerk\_max}(2)^2+ \ldots + \text{Jerk\_max}(n)^2)^{1/2};$$

step 4: verifying the physical quantities of the motion parameters of the generalized virtual axis by back projection using an n-dimensional space projection method based on the vector relation among the n axes of the robot determined by the starting point and the target point of the PTP motion of the robot so as to judge whether each axis can satisfy the preset constraints on the physical quantities of the motion parameters, in particular, calculating the projection of the physical quantities of the motion parameters of the generalized virtual axis in each dimension of the n-dimensional space based on the vector relation determined by the current PTP motion, if the projection in a certain dimension cannot satisfy the preset physical quantities of the motion parameters of the axis, recalculating actual physical quantities of motion parameters corresponding to the generalized virtual axis based on the parameter constraints, and if all axes can satisfy the preset physical quantities of the motion parameters, obtaining actual physical quantities of motion parameters of the generalized virtual axis, wherein, for velocity, the projection of Vel_unite in each dimension of the n-dimensional space is verified based on the vector relation determined by the current PTP motion until all axes satisfy velocity constraints, and then the maximum velocity of the generalized virtual axis is recorded as Vel_unite'; for acceleration, the projection of Acc_unite in each dimension of the n-dimensional space is verified based on the vector relation determined by the current PTP motion until all axes satisfy acceleration constraints, and then the maximum acceleration of the generalized virtual axis is recorded as Acc_unite'; for jerk, the projection of Jerk_unite in each dimension of the n-dimensional space is verified based on the vector relation determined by the current PIT motion until all axes satisfy jerk constraints, and then the maximum jerk of the generalized virtual axis is recorded as Jerk_unite'; and when the robot teaches different PTP trajectories, the vector relation determined by the corresponding PIT motion is different, and the actual physical quantities of the motion parameters of the generalized virtual axis obtained after verification are also different;

step 5: planning the motion displacement of the generalized virtual axis by a trajectory planning module in a robot control system based on the actual physical quantities of the motion parameters of the generalized virtual axis obtained through verification, wherein the trajectory planning method in the robot control system may be an S-curve trajectory planning method or a quintic polynomial trajectory planning method or the like; and step 6: after the trajectory planning of the generalized virtual axis is completed, performing orthographic projection by the n-dimensional space projection method based on the vector relation among all axes determined by the PTP motion of the robot so as to obtain a component of a motion curve of the generalized virtual axis in each dimension of the n-dimensional space, i.e. a motion curve of each axis of the robot, wherein the curve satisfies the preset constraints on each axis.

After the motion curve of each axis of the robot is planned, an interpolation position corresponding to each axis is obtained by an interpolation module in the robot control system, and the robot executes an interpolation command to complete the PTP motion.

Since the motion curve of each axis of the robot is obtained by projecting a motion trajectory of the generalized virtual axis, the change trend of the motion curve of each axis is consistent with that of the motion curve of the generalized virtual axis. When the generalized virtual axis performs accelerated or decelerated motion, the curve decomposed onto each axis is also in an accelerated or decelerated motion process; and when the generalized virtual axis performs uniform motion, the curve decomposed onto each axis is also in a uniform motion process. The motion curves of all axes of the robot have a consistent change trend, which enables the robot to have smooth motion trajectories and the system to be stressed without impact. Moreover, a trajectory planning curve of each axis of the robot satisfies its preset constraints on the physical quantities of the motion parameters after projection; and all axes can be started simultaneously and stopped simultaneously when each axis runs based on its trajectory planning curve. The verification by back projection using the n-dimensional space projection method in the trajectory planning of the generalized virtual axis allows that the execution time of the PTP motion of the robot is optimal, and at least one axis reaches its maximum running capability during motion, thus effectively ensuring the operating efficiency of the robot.

The trajectory planning method for point-to-point motion of a robot according to the invention can satisfy the application requirements on synchronous operation of all axes of the robot during the PTP motion. Separated trajectory planning for each axis is avoided during the selection of a reference axis, thus reducing the number of trajectory planning in the PTP motion of the robot. Compared with a conventional method, the method of the invention has a small calculation amount, can be highly achieved in the control system, and meets the requirements on real-time performance in robot control. In the method of the invention, trajectory planning is performed on the generalized virtual axis and the motion parameters of each axis are verified by the n-dimensional space projection method such that the planned motion curves of all axes have a consistent change trend, and the acceleration and deceleration process of each axis is synchronous with that of other axes. In the multi-axis composite motion process of the robot, the entire system is stressed without impact and abrupt change, the robot has smooth motion trajectories, and moving parts have low loss. The trajectories of the robot planned during the PTP motion by the method of the invention are not beyond the preset constraints on the physical quantities of the motion parameters of each axis, and allow all axes to reach the maximum moving capability as much as possible within an allowable range of parameters. The trajectory planning method of the invention enables the robot to operate at an optimal time, thus effectively ensuring the operating efficiency of the robot during working and greatly improving the motion tempo of the robot in an actual working task. The trajectory planning method for point-to-point motion in robot joint space provided by the invention is characterized by strong real-time performance, a soft motion curve, an optimal control time and a good algorithm execution effect, and therefore suitable for field applications of industrial robots.

DETAILED DESCRIPTION OF THE INVENTION

Figure 1:
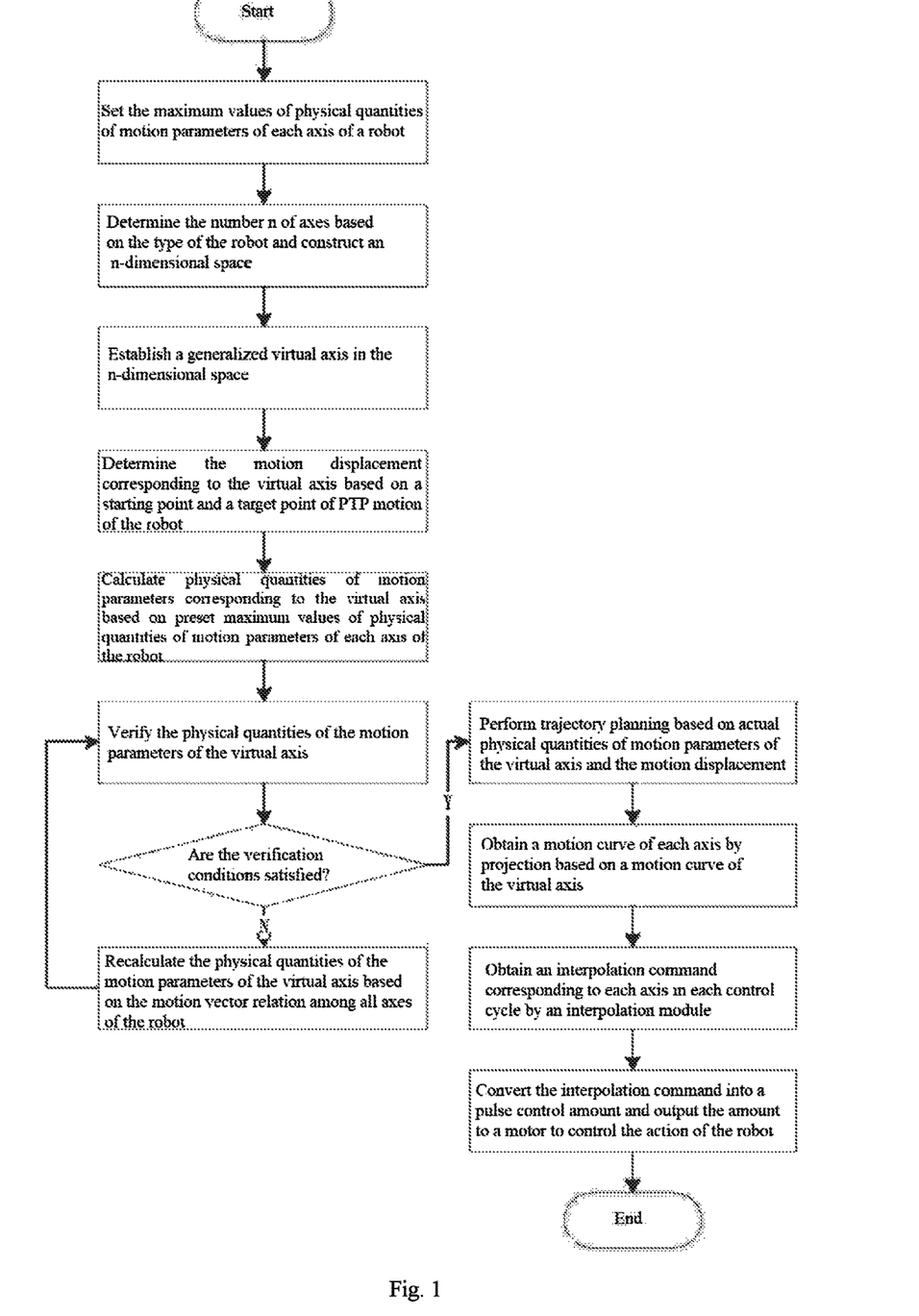
FIG. 1 is a control flowchart of the method of the invention.
Figure 2:
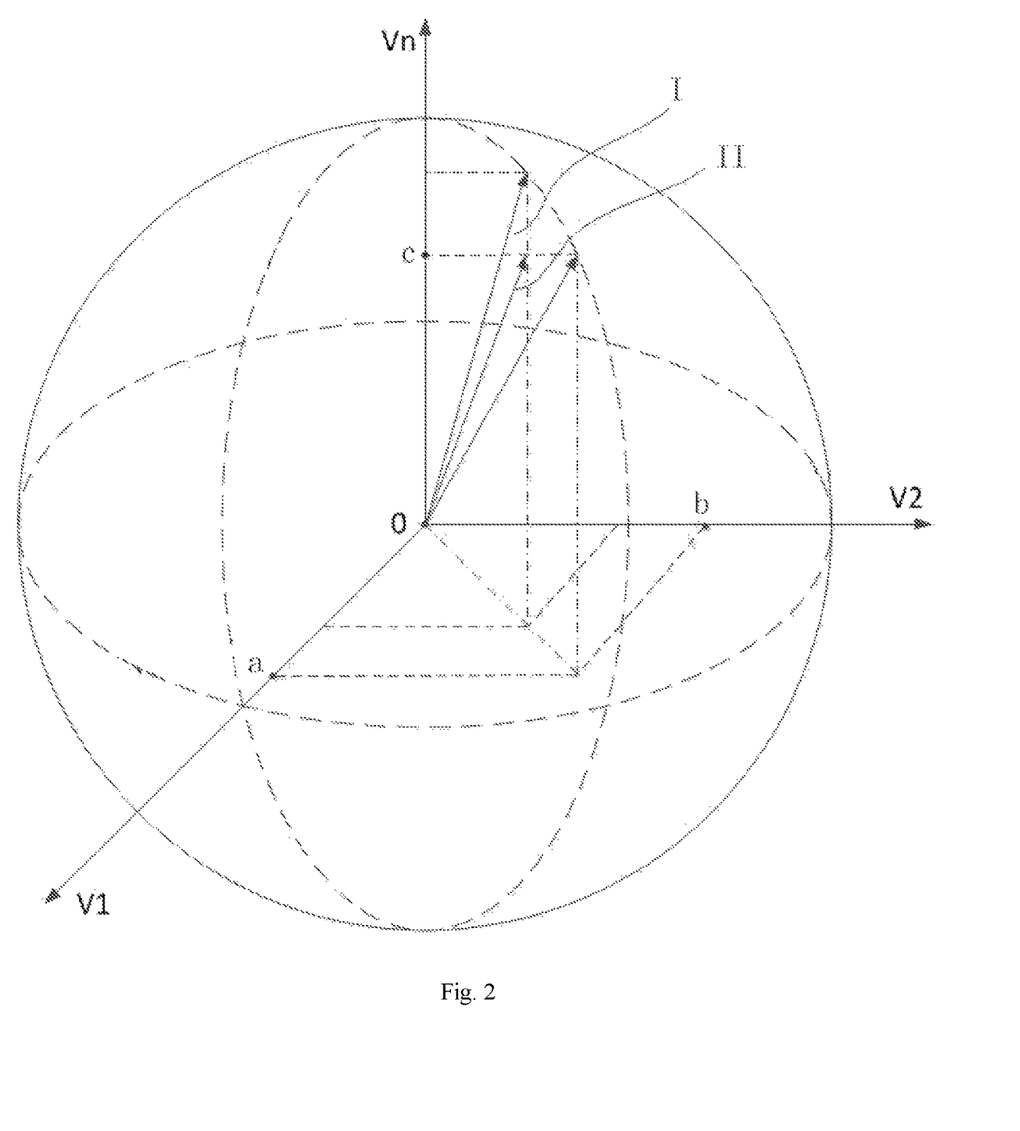
FIG. 2 is a schematic view of velocity verification by space projection in the method of the invention, wherein I represents the maximum velocity Vel_unite before verification; II represents the maximum velocity Vel_unite' of a virtual axis after verification; a represents a preset maximum velocity Vel_max(1) of 1 axis; b represents a preset maximum velocity Vel_max(2) of 2 axes; and c represents a preset maximum velocity Vel_max(n) of n axes.
Figure 3:
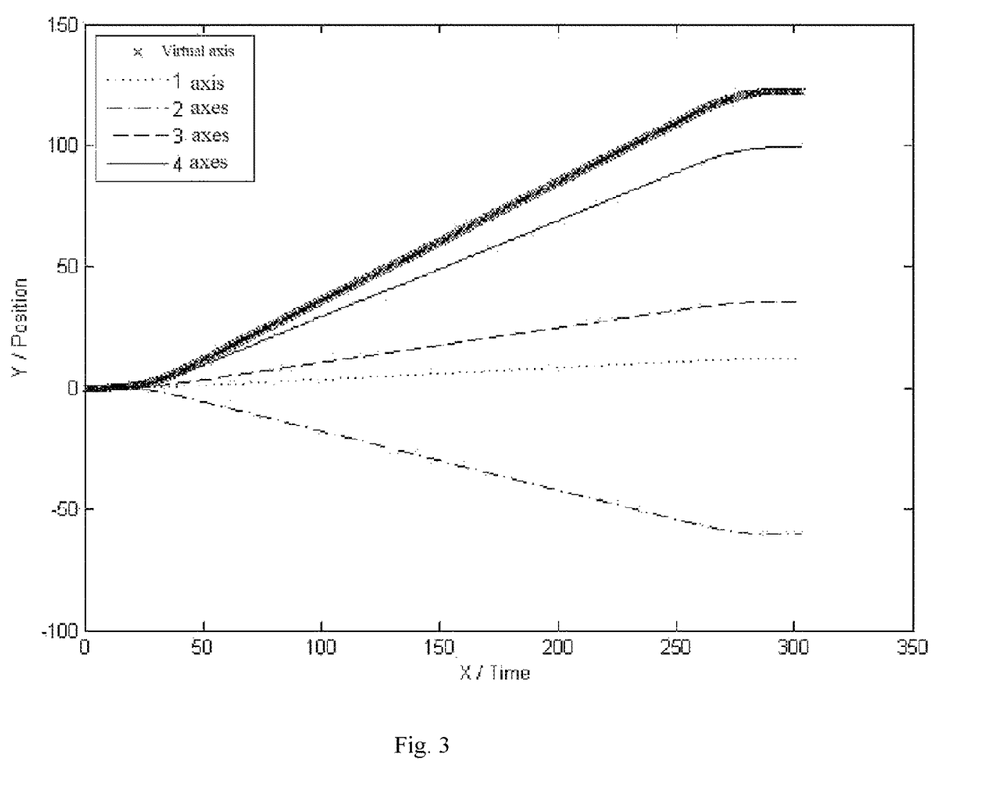
FIG. 3 is a schematic view of a displacement curve of point-to-point motion of a robot in the method of the invention.
Figure 4:
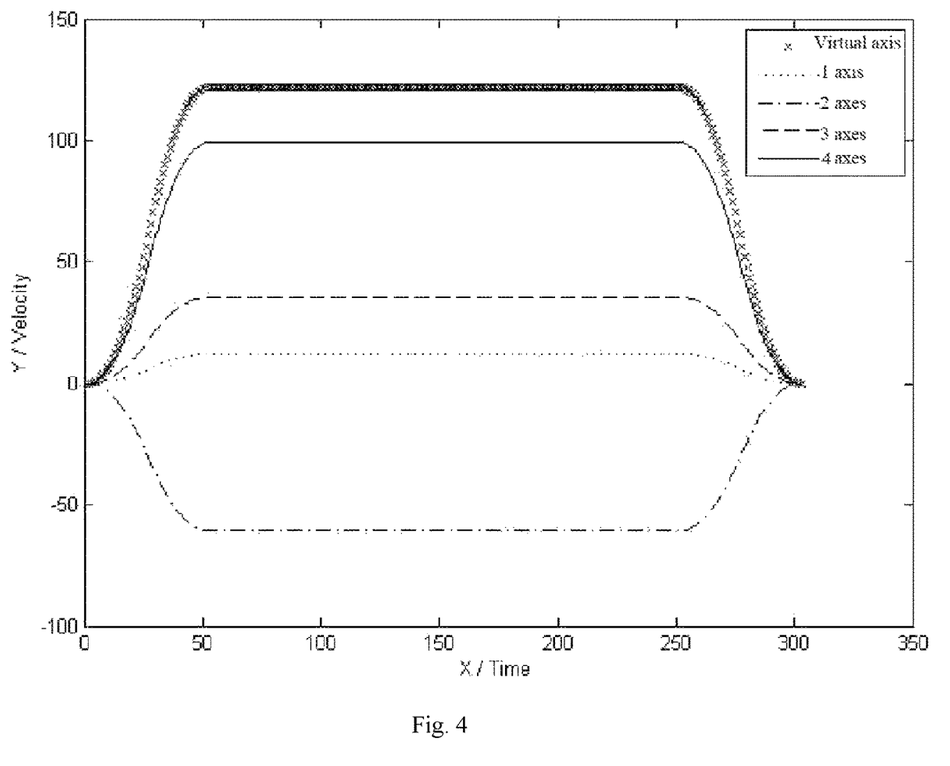
FIG. 4 is a schematic view of a velocity curve of the point-to-point motion of the robot in the method of the invention.

In order to make the objects, technical solutions and advantages of the invention clearer, the invention will be further described below in detail with reference to the drawings and particular embodiments.

An SCARA robot will be taken as an example to illustrate the specific implementation of the method of the invention.

An SCARA (Selective Compliance Assembly Robot Arm) is a cylindrical coordinate industrial robot. The SCARA robot comprises 4 axes, 3 of which are rotary axes whose axial lines are parallel to each other for positioning and orientation in a plane, and the other one of which is a moving axis for completing the motion of an end piece perpendicular to the plane.

In the actual working process, the maximum velocity of all the axes of the SCARA robot can be set to 100°/s, 100°/s, 100 mm/s and 100°/s respectively; the maximum acceleration thereof can be set to 1000°/(s*s), 1000°/(s*s), 1000 mm/(s*s) and 1000°/(s*s) respectively; and the maximum jerk thereof can be set to 2000°/(s*s*s), 2000°/(s*s*s), 2000 mm/(s*s*s) and 2000°/(s*s*s) respectively.

When teaching a SCARA robot, a starting point of current PTP motion is set to P1, its positions corresponding to all the axes are set to (0, 0, 0, 0), a target point of the PTP motion is set to P2, and its positions corresponding to all the axes are set to (12.06, −60.6605, 35.5721, 99.3048), wherein the unit of axis 1, 2 and 4 is degree, and the unit of axis 3 is millimeter.

In the method of the invention, an n-dimensional space is first constructed based on the type of a robot, and a generalized virtual axis is defined in the space, wherein the generalized virtual axis is a vector in the n-dimensional space, which is determined by a starting point and a target point of the PTP motion of the robot, and its property describes the vector relation among n axes of the SCARA robot. For the SCARA robot, the value of n is 4.

The displacement of each axis of the robot is determined based on the starting point and the target point of the PTP motion of the SCARA robot, and respectively recorded as S1, S2, ..., S4. The motion displacement Sunite corresponding to the generalized virtual axis is calculated, wherein the relation between the generalized virtual axis and the displacement of each axis of the robot is as follows:

$$Sunite=(S1^2+S2^2+\ldots+S4^2)^{1/2}$$

Physical quantities of motion parameters of the generalized virtual axis are calculated based on preset constraints on physical quantities of motion parameters of each axis of the SCARA robot. The maximum velocity corresponding to the generalized virtual axis is recorded as Vel_unite, the maximum acceleration corresponding to the generalized virtual axis is recorded as Acc_unite and the maximum jerk corresponding to the generalized virtual axis is recorded as Jerk_unite.

The physical quantities of the motion parameters of the generalized virtual axis are verified by back projection using an n-dimensional space projection method based on the vector relation among the 4 axes determined by the PTP motion of the SCARA robot so as to judge whether each axis can satisfy the preset constraints. For velocity, if the projection of the velocity Vel_unite of the generalized virtual axis in a certain dimension exceeds the maximum velocity of the axis, the velocity of the generalized virtual axis is recalculated until all axes can satisfy the preset constraints, thus obtaining an actual velocity Vel_unite' of the generalized virtual axis. The acceleration and jerk of the generalized virtual axis are verified in the same manner as the velocity of the generalized virtual axis, and an actual acceleration Acc_unite' and an actual jerk Jerk_unite' which satisfy the constraints are obtained after verification. For acceleration, if the projection of the acceleration Acc_unite of the generalized virtual axis in a certain dimension exceeds the maximum acceleration of the axis, the acceleration of the generalized virtual axis is recalculated until all axes can satisfy the preset constraints, thus obtaining an actual acceleration Acc_unite' of the generalized virtual axis. For jerk, if the projection of the jerk Jerk_unite of the generalized virtual axis in a certain dimension exceeds the maximum jerk of the axis, the jerk of the generalized virtual axis is recalculated until all axes can satisfy the preset constraints, thus obtaining an actual jerk Jerk_unite' of the generalized virtual axis.

The displacement of the generalized virtual axis is planned by a trajectory planning module in a robot control system based on the actual physical quantities of the motion parameters of the generalized virtual axis obtained through verification, wherein S-curve trajectory planning can be performed, and the velocity, acceleration and jerk during planning are respectively recorded as Vel_unite', Acc_unite' and Jerk_unite'.

After the trajectory planning of the generalized virtual axis is completed, orthographic projection is performed by the n-dimensional space projection method based on the vector relation among all axes determined by the PTP motion of the SCARA robot so as to obtain a component of a motion curve of the generalized virtual axis in each dimension. A motion curve of each axis of a SCARA robot is obtained.

After the motion curve of each axis of the robot is planned, an interpolation position corresponding to each axis in each control cycle is obtained by an interpolation module in the robot control system and converted into a pulse command which is then sent to a motor, and the SCARA robot executes an interpolation command to complete the PTP motion from the starting point P1 to the target point P2.

Through the above approach, the robot control system can achieve the trajectory planning of point-to-point motion, and the interpolation module performs interpolation based on the planned trajectories, thus achieving high-precision control of the robot motion process. The method used in the invention can allow reasonable and effective planning of the motion curve of the robot in the joint space. The method is characterized by a smooth motion curve, an optimal control time, strong algorithm real-time performance and high operating efficiency, capable of meeting the requirements of the robot control system, and therefore suitable for field applications of industrial robots.

The "robot control system" involved in the invention mainly includes a robot controller and a servo driver for controlling the robot to execute a specified working task.

The above description only refers to an embodiment of the invention and hence does not limit the patent scope of the invention. All the equivalent structural or process transformations conducted according to the contents of the description and the accompanying drawings of the invention, which are directly or indirectly used in other relevant technical fields, should similarly be included in the patent protection scope of the invention.

The invention claimed is:

1. A trajectory planning method for point-to-point (PTP) motion in robot joint space, comprising the steps of:

step 1: determining the number n of axes based on the type of a robot, constructing an n-dimensional space with each axis of the robot as a vector, where and defining a generalized virtual axis in the n-dimensional space to describe the vector relation among the n axes of the robot, wherein the generalized virtual axis is a vector in the n-dimensional space, which is determined by a starting point and a target point of the PTP motion of the robot;

step 2: determining the displacement of each axis of the robot based on the starting point and the target point of the PTP motion of the robot, which is respectively recorded as S1, S2, ..., Sn; and calculating the motion displacement Sunite corresponding to the generalized virtual axis:

$$Sunite = (S1^2 + S2^2 + L + Sn^2)^{1/2}$$

step 3: calculating physical quantities of motion parameters corresponding to the generalized virtual axis, including the maximum velocity, the maximum acceleration and the maximum jerk allowed by a system during the motion of the robot, based on preset constraints on physical quantities of motion parameters of each axis of the robot;

step 4: verifying the physical quantities of the motion parameters of the generalized virtual axis by back projection using an n-dimensional space projection method based on the vector relation among the n axes of the robot determined by the starting point and the target point of the PTP motion of the robot so as to judge whether each axis can satisfy the preset constraints on the physical quantities of the motion parameters:

calculating the projection of the physical quantities of the motion parameters of the generalized virtual axis in each dimension of the n-dimensional space based on the vector relation determined by the current PTP motion; if the projection in a certain dimension cannot satisfy the preset physical quantities of the motion parameters of the axis, recalculating the physical quantities of motion parameters corresponding to the generalized virtual axis based on the parameter constraints; and if all axes can satisfy the preset physical quantities of the motion parameters, obtaining actual physical quantities of motion parameters of the generalized virtual axis;

step 5: planning the motion displacement of the generalized virtual axis by a trajectory planning module in a robot control system based on the actual physical quantities of the motion parameters of the generalized virtual axis obtained through verification;

step 6: after the trajectory planning of the generalized virtual axis is completed, performing orthographic projection by the n-dimensional space projection method based on the vector relation among all axes determined by the PTP motion of the robot so as to obtain a component of a motion curve of the generalized virtual axis in each dimension of the n-dimensional space, wherein a motion curve of each axis of the robot is obtained;

step 7: obtaining an interpolation command corresponding to each axis using an interpolation module in a robot control system; and step 8: converting the interpolation command into a pulse command step 9: controlling the action of the robot with the pulse command.

2. The trajectory planning method for point-to-point motion in robot joint space according to claim 1, wherein,
in said calculating physical quantities of motion parameters corresponding to the generalized virtual axis in the step 3, the maximum velocity (Vel_unite) corresponding to the generalized virtual axis is as follows:

$$\text{Vel\_unite} = (\text{Vel\_max}(1)^2 + \text{Vel\_max}(2)^2 + L + \text{Vel\_max}(n)^2)^{1/2};$$

where Vel_max(i) is a preset maximum velocity of each axis of the robot, i denotes the axis number of the robot and its value is 1, 2, ..., n.

3. The trajectory planning method for point-to-point motion in robot joint space according to claim 1, wherein,
in said calculating physical quantities of motion parameters corresponding to the generalized virtual axis in the step 3, the maximum acceleration (Acc_unite) corresponding to the generalized virtual axis is as follows:

$$\text{Acc\_unite} = (\text{Acc\_max}(1)^2 + \text{Acc\_max}(2)^2 + L + \text{Acc\_max}(n)^2)^{1/2}; \text{ and}$$

where Acc_max(i) is a preset maximum acceleration of each axis of the robot.

4. The trajectory planning method for point-to-point motion in robot joint space according to claim 1, wherein,
in said calculating physical quantities of motion parameters corresponding to the generalized virtual axis in the step 3, the maximum jerk (Jerk_unite) corresponding to the generalized virtual axis is as follows:

$$\text{Jerk\_unite} = (\text{Jerk\_max}(1)^2 + \text{Jerk\_max}(2)^2 + L + \text{Jerk\_max}(n)^2)^{1/2};$$

wherein Jerk_max(i) is a preset maximum jerk of each axis of the robot.

5. The trajectory planning method for point-to-point motion in robot joint space according to claim 2, wherein,
in said judging whether each axis can satisfy the preset constraints on the physical quantities of the motion parameters in the step 4, the projection of Vel_unite in each dimension of the n-dimensional space is verified based on the vector relation determined by the current PTP motion until all axes satisfy velocity constraints, and then the maximum velocity of the generalized virtual axis is recorded as Vel_unite'.

6. The trajectory planning method for point-to-point motion in robot joint space according to claim 3, wherein,
in said judging whether each axis can satisfy the preset constraints on the physical quantities of the motion parameters in the step 4, the projection of Acc_unite in each dimension of the n-dimensional space is verified based on the vector relation determined by the current PTP motion until all axes satisfy acceleration constraints, and then the maximum acceleration of the generalized virtual axis is recorded as Acc_unite'.

7. The trajectory planning method for point-to-point motion in robot joint space according to claim 4, wherein,
in said judging whether each axis can satisfy the preset constraints on the physical quantities of the motion parameters in the step 4, the projection of Jerk_unite in each dimension of the n-dimensional space is verified based on the vector relation determined by the current PTP motion until all axes satisfy jerk constraints, and then the maximum jerk of the generalized virtual axis is recorded as Jerk_unite'.

8. The trajectory planning method for point-to-point motion in robot joint space according to any one of claims 1 to 7, wherein,
in the step 5, the trajectory planning method in the robot control system is an S-curve trajectory planning method or a quintic polynomial trajectory planning method.

* * * * *